United States Patent
Jalan et al.

(10) Patent No.: US 10,389,835 B2
(45) Date of Patent: Aug. 20, 2019

(54) APPLICATION AWARE SYSTEMS AND METHODS TO PROCESS USER LOADABLE NETWORK APPLICATIONS

(71) Applicant: A10 Networks, Inc., San Jose, CA (US)

(72) Inventors: Rajkumar Jalan, Saratoga, CA (US); Rishi Sampat, Santa Clara, CA (US); Swaminathan Sankar, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 306 days.

(21) Appl. No.: 15/403,109

(22) Filed: Jan. 10, 2017

(65) Prior Publication Data
US 2018/0198879 A1    Jul. 12, 2018

(51) Int. Cl.
*H04L 29/06* (2006.01)
*H04L 29/08* (2006.01)

(52) U.S. Cl.
CPC .......... *H04L 67/2819* (2013.01); *H04L 67/02* (2013.01); *H04L 67/146* (2013.01); *H04L 67/327* (2013.01); *H04L 67/42* (2013.01); *H04L 69/161* (2013.01)

(58) Field of Classification Search
CPC ... H04L 65/1006; H04L 67/02; H04L 67/146; H04L 67/2819; H04L 67/327; H04L 67/42; H04L 69/161
See application file for complete search history.

(56) References Cited

U.S. PATENT DOCUMENTS

| | | |
|---|---|---|
| 5,774,660 A | 6/1998 | Brendel et al. |
| 5,862,339 A | 1/1999 | Bonnaure et al. |
| 5,875,185 A | 2/1999 | Wang et al. |
| 5,958,053 A | 9/1999 | Denker |
| 6,003,069 A | 12/1999 | Cavill |
| 6,047,268 A | 4/2000 | Bartoli et al. |
| 6,075,783 A | 6/2000 | Voit |
| 6,131,163 A | 10/2000 | Wiegel |
| 6,321,338 B1 | 11/2001 | Porras et al. |
| 6,374,300 B2 | 4/2002 | Masters |
| 6,456,617 B1 | 9/2002 | Oda et al. |
| 6,483,600 B1 | 11/2002 | Schuster et al. |

(Continued)

FOREIGN PATENT DOCUMENTS

| | | |
|---|---|---|
| CN | 1372662 A | 10/2002 |
| CN | 1473300 A | 2/2004 |

(Continued)

OTHER PUBLICATIONS

Search Report and Written Opinion dated Jan. 5, 2018 for PCT Application No. PCT/US2017/057722.

(Continued)

*Primary Examiner* — June Y Sison
(74) *Attorney, Agent, or Firm* — Keith Kline; The Kline Law Firm PC

(57) ABSTRACT

Described herein are methods and systems for application aware fastpath processing over a data network. In some examples, application fastpath operates to facilitate application specific fastpath processing of data packets transferred between a client device and a server device over a network session of a data network.

20 Claims, 7 Drawing Sheets

(56) References Cited

U.S. PATENT DOCUMENTS

| | | |
|---|---|---|
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,772,205 B1 | 8/2004 | Lavian et al. |
| 6,772,334 B1 | 8/2004 | Glawitsch |
| 6,779,033 B1 | 8/2004 | Watson et al. |
| 6,804,224 B1 | 10/2004 | Schuster et al. |
| 7,010,605 B1 | 3/2006 | Dharmarajan |
| 7,058,718 B2 | 6/2006 | Fontes et al. |
| 7,069,438 B2 | 6/2006 | Balabine et al. |
| 7,143,087 B2 | 11/2006 | Fairweather |
| 7,167,927 B2 | 1/2007 | Philbrick et al. |
| 7,181,524 B1 | 2/2007 | Lele |
| 7,228,359 B1 | 6/2007 | Monteiro |
| 7,254,133 B2 | 8/2007 | Govindarajan et al. |
| 7,269,850 B2 | 9/2007 | Govindarajan et al. |
| 7,301,899 B2 | 11/2007 | Goldstone |
| 7,310,686 B2 | 12/2007 | Uysal |
| 7,328,267 B1 | 2/2008 | Bashyam et al. |
| 7,337,241 B2 | 2/2008 | Boucher et al. |
| 7,343,399 B2 | 3/2008 | Hayball et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,467,202 B2 | 12/2008 | Savchuk |
| 7,506,360 B1 | 3/2009 | Wilkinson et al. |
| 7,512,980 B2 | 3/2009 | Copeland et al. |
| 7,552,323 B2 | 6/2009 | Shay |
| 7,584,262 B1 | 9/2009 | Wang et al. |
| 7,590,736 B2 | 9/2009 | Hydrie et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,711,790 B1 | 5/2010 | Barrett et al. |
| 7,733,866 B2 | 6/2010 | Mishra et al. |
| 7,747,748 B2 | 6/2010 | Allen |
| 7,826,487 B1 | 11/2010 | Mukerji et al. |
| 7,965,727 B2 | 6/2011 | Sakata et al. |
| 7,979,694 B2 | 7/2011 | Touitou et al. |
| 7,990,847 B1 | 8/2011 | Leroy et al. |
| 7,992,201 B2 | 8/2011 | Aldridge et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1 | 4/2012 | Le et al. |
| 8,185,651 B2 | 5/2012 | Moran et al. |
| 8,261,339 B2 | 9/2012 | Aldridge et al. |
| 8,379,515 B1 | 2/2013 | Mukerji |
| 8,559,437 B2 | 10/2013 | Mishra et al. |
| 8,560,693 B1 | 10/2013 | Wang et al. |
| RE44,701 E | 1/2014 | Chen et al. |
| 8,681,610 B1 | 3/2014 | Mukerji |
| 8,782,221 B2 | 7/2014 | Han |
| 8,977,749 B1 | 3/2015 | Han |
| 8,996,670 B2 | 3/2015 | Kupinsky et al. |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,584 B1 | 10/2015 | Han |
| 9,386,088 B2 | 7/2016 | Zheng et al. |
| 9,455,956 B2 | 9/2016 | Mihelich et al. |
| 9,531,846 B2 | 12/2016 | Han et al. |
| 9,602,442 B2 | 3/2017 | Han |
| 2001/0042200 A1 | 11/2001 | Lamberton et al. |
| 2002/0026515 A1 | 2/2002 | Michielsens et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0138618 A1 | 9/2002 | Szabo |
| 2002/0141386 A1 | 10/2002 | Minert et al. |
| 2002/0143991 A1 | 10/2002 | Chow et al. |
| 2002/0188678 A1 | 12/2002 | Edecker et al. |
| 2003/0009591 A1 | 1/2003 | Hayball et al. |
| 2003/0035409 A1 | 2/2003 | Wang et al. |
| 2003/0061506 A1 | 3/2003 | Cooper et al. |
| 2003/0135625 A1 | 7/2003 | Fontes et al. |
| 2004/0010545 A1 | 1/2004 | Pandya |
| 2004/0062246 A1 | 4/2004 | Boucher et al. |
| 2004/0073703 A1* | 4/2004 | Boucher ............ H04L 69/16 709/245 |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0250059 A1 | 12/2004 | Ramelson et al. |
| 2005/0005207 A1 | 1/2005 | Herneque |
| 2005/0036511 A1 | 2/2005 | Baratakke et al. |
| 2005/0039033 A1 | 2/2005 | Meyers et al. |
| 2005/0080890 A1 | 4/2005 | Yang et al. |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0281190 A1 | 12/2005 | McGee et al. |
| 2006/0023721 A1 | 2/2006 | Miyake et al. |
| 2006/0036610 A1 | 2/2006 | Wang |
| 2006/0041745 A1 | 2/2006 | Parnes |
| 2006/0069804 A1 | 3/2006 | Miyake et al. |
| 2006/0164978 A1 | 7/2006 | Werner et al. |
| 2006/0168319 A1 | 7/2006 | Trossen |
| 2006/0230129 A1 | 10/2006 | Swami et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0124502 A1 | 5/2007 | Li |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0120129 A1 | 5/2008 | Seubert et al. |
| 2008/0225722 A1 | 9/2008 | Khemani et al. |
| 2008/0253390 A1 | 10/2008 | Das et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0077651 A1 | 3/2009 | Poeluev |
| 2009/0092124 A1 | 4/2009 | Singhal et al. |
| 2009/0138606 A1 | 5/2009 | Moran et al. |
| 2009/0138945 A1 | 5/2009 | Savchuk |
| 2009/0164614 A1 | 6/2009 | Christian et al. |
| 2009/0285196 A1 | 11/2009 | Lee et al. |
| 2009/0288134 A1 | 11/2009 | Foottit et al. |
| 2010/0042869 A1 | 2/2010 | Szabo et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0095018 A1 | 4/2010 | Khemani et al. |
| 2010/0106854 A1 | 4/2010 | Kim et al. |
| 2010/0205310 A1 | 8/2010 | Altshuler et al. |
| 2010/0228819 A1 | 9/2010 | Wei |
| 2010/0235522 A1 | 9/2010 | Chen et al. |
| 2010/0238828 A1 | 9/2010 | Russell |
| 2010/0262819 A1 | 10/2010 | Yang et al. |
| 2010/0265824 A1 | 10/2010 | Chao et al. |
| 2010/0268814 A1 | 10/2010 | Cross et al. |
| 2010/0318631 A1 | 12/2010 | Shukla |

(56) References Cited

U.S. PATENT DOCUMENTS

| | | |
|---|---|---|
| 2010/0322252 A1 | 12/2010 | Suganthi et al. |
| 2010/0333101 A1 | 12/2010 | Pope et al. |
| 2011/0007652 A1 | 1/2011 | Bai |
| 2011/0032941 A1 | 2/2011 | Quach et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099623 A1 | 4/2011 | Garrard et al. |
| 2011/0149879 A1 | 6/2011 | Noriega et al. |
| 2011/0209157 A1 | 8/2011 | Sumida et al. |
| 2011/0276982 A1 | 11/2011 | Nakayama et al. |
| 2011/0302256 A1 | 12/2011 | Sureshchandra et al. |
| 2012/0008495 A1 | 1/2012 | Shen et al. |
| 2012/0039175 A1 | 2/2012 | Sridhar et al. |
| 2012/0117382 A1 | 5/2012 | Larson et al. |
| 2012/0173759 A1 | 7/2012 | Agarwal et al. |
| 2012/0215910 A1 | 8/2012 | Wada |
| 2012/0290727 A1 | 11/2012 | Tivig |
| 2013/0135996 A1 | 5/2013 | Torres et al. |
| 2013/0136139 A1* | 5/2013 | Zheng .................. H04L 67/1014 370/401 |
| 2013/0166762 A1 | 6/2013 | Jalan et al. |
| 2013/0176854 A1 | 7/2013 | Chisu et al. |
| 2013/0176908 A1 | 7/2013 | Baniel et al. |
| 2013/0191486 A1 | 7/2013 | Someya et al. |
| 2013/0250765 A1 | 9/2013 | Ehsan |
| 2013/0258846 A1 | 10/2013 | Damola |
| 2014/0012972 A1 | 1/2014 | Han |
| 2014/0086052 A1 | 3/2014 | Cai et al. |
| 2014/0169168 A1 | 6/2014 | Jalan et al. |
| 2014/0207845 A1 | 7/2014 | Han et al. |
| 2014/0254367 A1 | 9/2014 | Jeong et al. |
| 2014/0258536 A1 | 9/2014 | Chiong |
| 2014/0286313 A1 | 9/2014 | Fu et al. |
| 2014/0359052 A1 | 12/2014 | Joachimpillai et al. |
| 2015/0026794 A1 | 1/2015 | Zuk et al. |
| 2015/0156223 A1 | 6/2015 | Xu et al. |
| 2015/0237173 A1 | 8/2015 | Virkki et al. |
| 2015/0244566 A1 | 8/2015 | Puimedon |
| 2015/0296058 A1 | 10/2015 | Jalan et al. |
| 2015/0312092 A1 | 10/2015 | Golshan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0014126 A1 | 1/2016 | Jalan et al. |
| 2017/0048107 A1 | 2/2017 | Dosovitsky et al. |
| 2017/0048356 A1 | 2/2017 | Thompson et al. |
| 2017/0201418 A1* | 7/2017 | Jalan .................. H04L 41/5051 |

FOREIGN PATENT DOCUMENTS

| | | |
|---|---|---|
| CN | 1529460 A | 9/2004 |
| CN | 1575582 A | 2/2005 |
| CN | 1910869 A | 2/2007 |
| CN | 101189598 A | 5/2008 |
| CN | 101442425 A | 5/2009 |
| CN | 101682532 A | 3/2010 |
| CN | 102123156 A | 7/2011 |
| CN | 102577252 A | 7/2012 |
| CN | 103533018 A | 1/2014 |
| CN | 103944954 A | 7/2014 |
| CN | 104040990 A | 9/2014 |
| CN | 104137491 A | 11/2014 |
| CN | 104796396 A | 7/2015 |
| CN | 102577252 B | 3/2016 |
| EP | 1209876 A2 | 5/2002 |
| EP | 2296313 A1 | 3/2011 |
| EP | 2760170 A1 | 7/2014 |
| EP | 2760170 B1 | 12/2015 |
| HK | 1189438 A | 6/2014 |
| HK | 1199153 A | 6/2015 |
| HK | 1199779 A | 7/2015 |
| HK | 1200617 A | 8/2015 |
| IN | 261CHE2014 A | 7/2016 |
| JP | 2000307634 A | 11/2000 |
| JP | 2014143686 A | 8/2014 |
| JP | 5906263 B2 | 4/2016 |
| KR | 1020130096624 A | 8/2013 |
| KR | 101576585 B1 | 12/2015 |
| TW | 269763 B | 2/1996 |
| TW | 425821 B | 3/2001 |
| TW | 444478 B | 7/2001 |
| WO | WO2001013228 A2 | 2/2001 |
| WO | WO2001014990 A1 | 3/2001 |
| WO | WO2003103237 A1 | 12/2003 |
| WO | WO2008053954 A1 | 5/2008 |
| WO | WO2011049770 A2 | 4/2011 |
| WO | WO2011079381 A1 | 7/2011 |
| WO | WO2013081952 A1 | 6/2013 |
| WO | WO2013096019 A1 | 6/2013 |
| WO | WO2014031046 A1 | 2/2014 |
| WO | WO2014093829 A1 | 6/2014 |
| WO | WO2015164026 A1 | 10/2015 |

OTHER PUBLICATIONS

Cardellini et al., "Dynamic Load Balancing on Web-server Systems", IEEE Internet Computing, vol. 3, No. 3, May-Jun. 1999, 24 pages.

Goldszmidt et al., "NetDispatcher: A TCP Connection Router," IBM Research Report RC 20853, May 19, 1997, pp. 1-31.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retreived on Apr. 13, 2016], Retrieved from the Internt: <URL:http://www.cyberciti.biz/faq/linux-tcp-tuning/>, 24 pages.

"Tcp—TCP Protocol," FreeBSD, Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>, 11 pages.

"Enhanced Interior Gateway Routing Protocol", Cisco, Document ID 16406, Sep. 9, 2005 update, 43 pages.

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

* cited by examiner

APPLICATION AWARE SYSTEMS AND METHODS TO PROCESS USER LOADABLE NETWORK APPLICATIONS

CROSS REFERENCE TO RELATED APPLICATIONS

This application is related to co-pending U.S. patent application Ser. No. 14/995,136 filed on Jan. 13, 2016 and entitled "System and Method to Process a Chain of Network Applications". The disclosure of the above-referenced application is incorporated herein in its entirety for all purposes.

FIELD OF THE INVENTION

This invention relates generally to data networks and more particularly to a data network operating application aware fastpath processing of network data traffic.

DESCRIPTION OF THE RELATED ART

In a typical network deployment scenario, a company, such as a service provider or a corporation, constructs a data network by purchasing or leasing one or more network devices, connects the devices with each other and to servers and gateways and configures the devices to reflect the network design. Although the data network is controlled and operated by the company, the company relies exclusively on the equipment vendor to provide functionality of the network devices. When the company purchases a personal computer or a server computer, the company can purchase or develop application software and download the software onto the computers. This application software is typically not supplied by the computer manufacturers. With this application software, the company can design a custom computing environment to fit their specific business needs. However, the company cannot add any network applications to their network devices.

It should be apparent from the foregoing that there is a need to provide a method to operate a user downloadable network application on a network device, and to provide application layer processing support to the user downloadable network application. There is also a need to provide fastpath processing by a data network that is specific to the many types of application data traffic that is processed by the network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present technology is directed to a servicing node comprising a fastpath module for processing data packets, wherein the fastpath module: receives an application service request data packet from a client device, over a network session between the client device and the servicing node; obtains one or more network addresses from the data packet and matches the obtained one or more network addresses with a session table for the network session between the client device and the servicing node; determines that the one or more network addresses match an ingress session of the session table; stores the application service request data packet into an ingress message; and transmits the data packet to a server using egress session information.

According to other embodiments, the present technology is directed to a corresponding method for processing data packets via a fastpath module stored in memory at a servicing node and executed by at least one processor.

BRIEF DESCRIPTION OF THE DRAWINGS

Embodiments are illustrated by way of example and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without department from the scope of what is claimed. The following detailed description is therefore not to be taken in a limiting sense, and the scope is defined by the appended claims and their equivalents.

Figure 1:
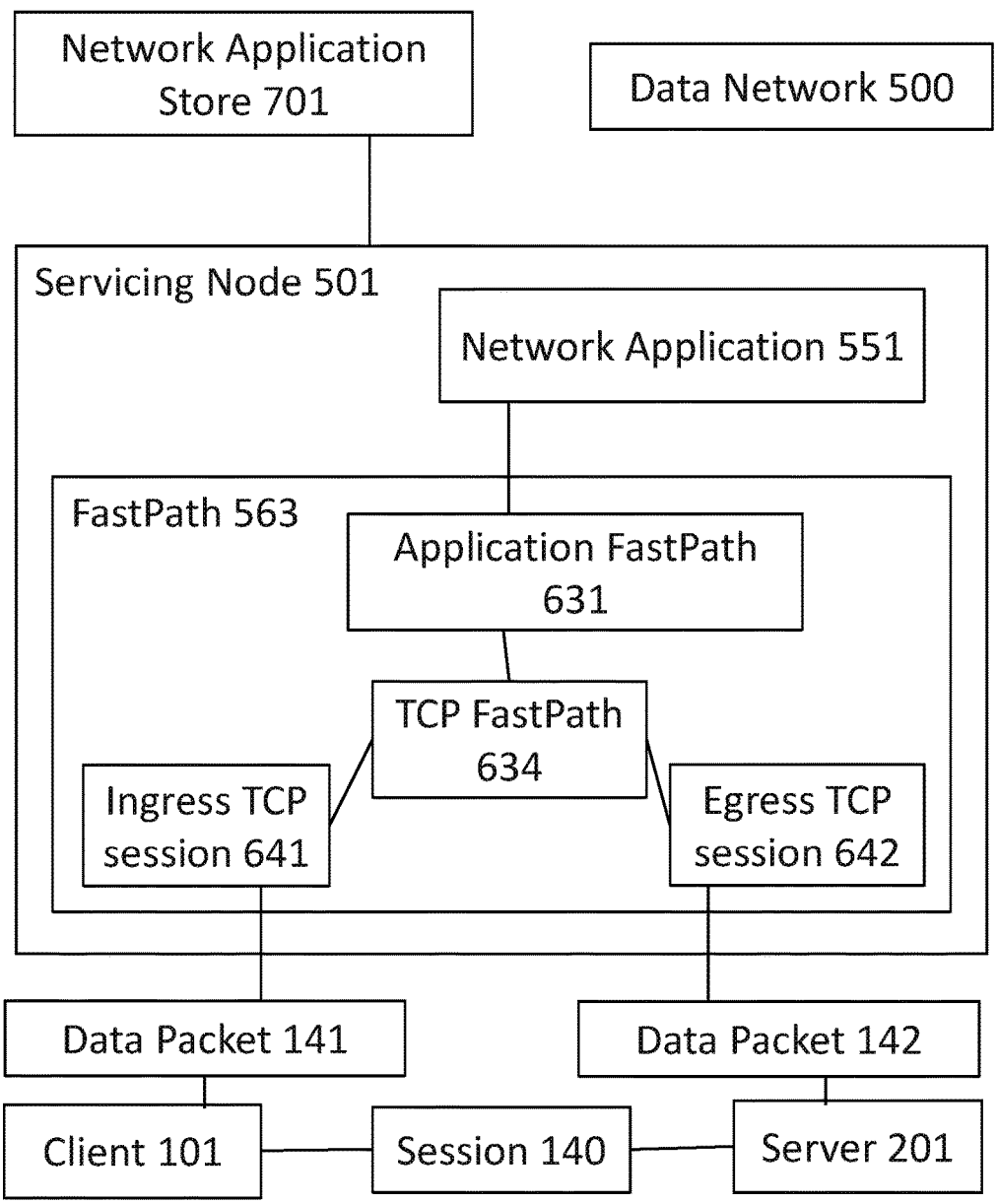
FIG. 1 illustrates an embodiment of a network servicing node processing a session based on an application aware fastpath.

FIG. 1 illustrates an exemplary embodiment of a servicing node processing a service session between a client device and a server device according to a user loadable network application. In one embodiment, client 101 conducts a communication service session 140 (also referred to herein as session 140) with server 201 over data network 500. A data packet 141 of session 140 is sent to data network 500 from client 101 or server 201 and a data packet 142 of session 140 is sent to data network 500 from server 201 to client 101. Data packets 141 and 142 are processed by servicing node 501. Servicing node 501 may modify both data packets and forward the possibly modified data packets to server 201 or client 101 respectively, according to a network application 551 residing in servicing node 501. In the exemplary embodiment depicted in FIG. 1, servicing node 501 includes a fastpath module 563 which is application layer aware and provides application layer processing for network application 551 such that network application 551 does not need to perform similar processing.

In various embodiments, servicing node 501 may be a hardware or software implementation, operating as a server load balancer, application delivery controller, router, physical or virtual switch, or any other network controller or component.

In one embodiment, data network 500 includes an Ethernet network, an ATM network, a cellular network, a wireless network, a Frame Relay network, an optical network, an IP network or any data communication network utilizing other physical layer, link layer capability or network layer to carry data packets.

In one embodiment, network application 551 is obtained by servicing node 501 via a network application store 701. Co-pending patent application Ser. No. 14/995,136 filed on Jan. 13, 2016 and entitled "System and Method to Process a Chain of Network Applications" describes a servicing node 501 obtaining network application 551 and is incorporated herein in its entirety. In various embodiments, network application store server 701 includes a server computer connected to data network 500 using a network module of the server computer. Network application store server 701 includes a storage storing a plurality of network applications. In one embodiment, network application store server 701 communicates and transfers network application 551 to servicing node 501 using a HTTP session, a file transfer session, a FTP session, a SIP session, an e-commerce session, an enterprise application session, an email session, a file sharing session, or a Web-based communication session. Network application 551 may be a plurality of network applications.

In an exemplary embodiment, session 140 is based on TCP protocol. Fastpath module 563 includes a TCP fastpath module 634 that processes session 140. TCP fastpath 634 processes an ingress TCP session 641 representing a section of session 140 between client 101 and servicing node 501, and an egress TCP session 642 representing a section of session 140 between servicing node 501 and server 201.

In an exemplary embodiment, fastpath module 563 includes an application fastpath module 631 which provides application layer processing capability for an application layer protocol used by network application 551. The application layer protocol can include one or more of HTTP, SIP, FTP, secure HTTP, instant messaging protocol, file transfer protocol, streaming protocol, or real time streaming protocol. Application layer processing capability can include one or more of TCP proxy, legal interception, firewall, secure session proxy, SSL proxy, proxy gateway, IP tunnel, IP-IP tunnel, IPv4-v6 tunnel, GRE, L2TP or other layer 3 tunnel gateway processing. Fastpath module 563 may be a high performance TCP stack that overrides the normal fastpath processing for network application 551. By being application layer aware, fastpath module 563 can be more discriminating in terms of which network application is performed and process network traffic differently based on the network application being implemented. Generally a fastpath module can process network traffic with less computing power and more throughput than a normal processing module. However, due to the minimal processing of most fastpath modules, they can lack the capability to discern different types of network traffic and apply different processing based on the application that the network traffic is directed to, or generated from. In the embodiment depicted in FIG. 1, fastpath module 563 includes application fastpath 631 which provides the application-specific fastpath processing of network data traffic.

In exemplary embodiments, servicing node 501 receives data packet 141 of session 140 from client 101. Fastpath module 563 determines data packet 141 is associated to ingress TCP session 641. TCP fastpath 634 processes data packet 141 according to information in ingress TCP session 641, and sends data packet 141 to application fastpath 631. In one embodiment, application fastpath 631 processes data packet 141, optionally modifies data packet 141 and sends processed data packet 141 to TCP fastpath 634, which sends data packet 141 to server 201 using egress TCP session 642 information. In one embodiment, application fastpath 631 informs network application 551 of data packet 641 and optionally sends data packet 141 to network application 551. In one embodiment, network application 551 sends a modified data packet 141 to application fastpath 631, which sends modified data packet 641 to TCP fastpath 634 for transmission to server 201.

In one embodiment, application fastpath 631 informs network application 551 an indication based on an application layer protocol, and sends data packet 141 to network application 551 as an application layer message. In one embodiment, application fastpath 631 combines data packet 141 with prior received data packets over ingress TCP session 641 into an application layer message prior to sending to network application 551. In one embodiment, network application 551 sends modified data packet 141 as an application layer message to application fastpath 631. In one embodiment application fastpath 631 sends received application layer message to server 201 using one or more TCP data packets over egress TCP session 642.

In one embodiment, servicing node 501 receives data packet 142 of session 140 from server 201. Fastpath module 563 determines data packet 142 is associated to egress TCP session 642. TCP fastpath 634 processes data packet 142 according to information in egress TCP session 642, and sends data packet 142 to application fastpath 631. In one embodiment, application fastpath 631 processes data packet 142, optionally modifies data packet 142 and sends processed data packet 142 to TCP fastpath 634, which sends data packet 142 to client 101 using ingress TCP session 641 information. In one embodiment, application fastpath 631 informs network application 551 of data packet 142 and optionally sends data packet 142 to network application 551. In one embodiment, network application 551 sends a modified data packet 142 to application fastpath 631, which sends modified data packet 641 to TCP fastpath 634 for transmission to client 101.

In one embodiment, application fastpath 631 informs network application 551 an indication based on an application layer protocol, and sends data packet 142 to network application 551 as an application layer message. For example, an application layer protocol of HTTP, SMT, or FTP may identify the associated application, thus allowing data packet 142 to be sent to the relevant processing module based on the application layer protocol. In one embodiment, application fastpath 631 combines data packet 141 with prior received data packets over egress TCP session 642 into the application layer message prior to sending to network application 551. In one embodiment, network application 551 sends modified data packet 142 as an application layer message to application fastpath 631. In one embodiment application fastpath 631 sends received application layer message to client 101 using one or more TCP data packets over ingress TCP session 641.

Figure 2:
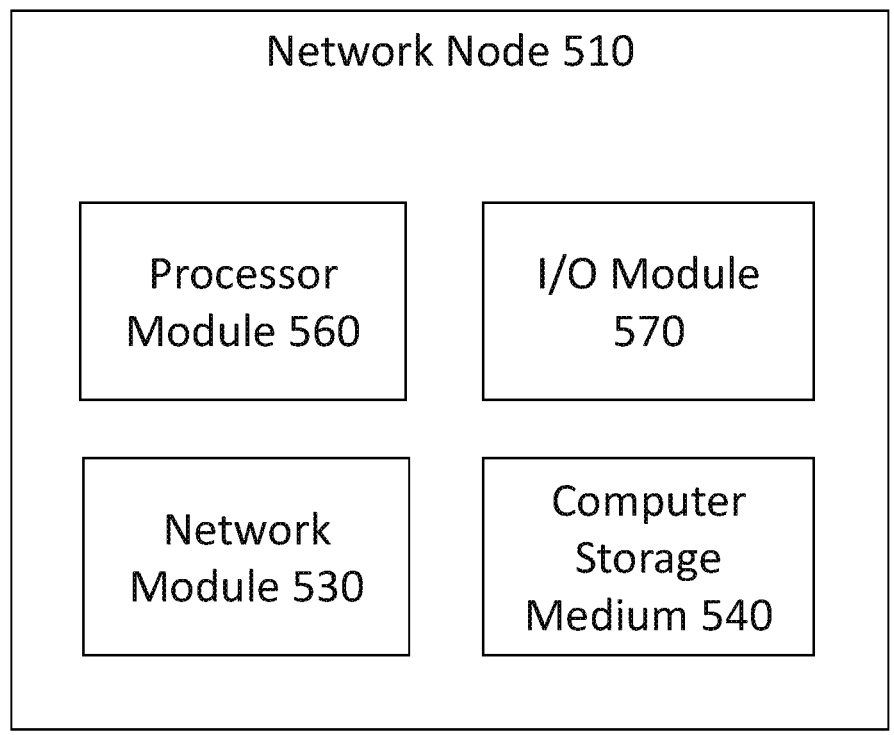
FIG. 2 illustrates a network node.

FIG. 2 illustrates an embodiment of a network node 510 which can be a servicing node, a network application store server, a client device or a server device. In one embodiment, network node 510 includes a processor module 560, a network module 530, and a computer storage module 540. In one embodiment, processor module 560 includes one or more processors which may be a micro-processor, an Intel processor, an AMD processor, a MIPS processor, an ARM-based processor, or a RISC processor. In one embodiment, processor module 560 includes one or more processor cores embedded in a processor. In one embodiment, processor module 560 includes one or more embedded processors, or embedded processing elements in a Field Programmable Gate Array (FPGA), an Application Specific Integrated Circuit (ASIC), or Digital Signal Processor (DSP). In one embodiment, network module 530 includes a network interface such as Ethernet, optical network interface, a wireless network interface, T1/T3 interface, a WAN or LAN interface. In one embodiment, network module 530 includes a network processor. In one embodiment, storage module 540 includes RAM, DRAM, SRAM, SDRAM or memory utilized by processor module 560 or network module 530. In one embodiment, storage module 540 stores data utilized by processor module 560. In one embodiment, storage module 540 includes a hard disk drive, a solid state drive, an external disk, a DVD, a CD, or a readable external disk. Storage module 540 stores one or more computer programming instructions which when executed by processor module 560 or network module 530 implement one or more of the functionality of this present invention. In one embodiment network node 510 includes an input/output (I/O) module 570, which may include a keyboard, a keypad, a mouse, a gesture based input sensor, a microphone, a physical or sensory input peripheral, a display, a speaker, or a physical or sensual output peripheral.

In one embodiment, client device 101 is a computing device connected to data network 500 using a network module of client device 101. Client device 101 can be a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising a network module and a processor module.

In one embodiment, server device 201 is a server computer connected to data network 500 using a network module of the server computer. Server device 201 serves application service session 140 requested by client device 101. In one embodiment, application service session 140 includes a HTTP session, a file transfer session, a FTP session, a voice over IP session, a SIP session, a video or audio streaming session, an e-commerce session, an enterprise application session, an email session, an online gaming session, a teleconference session, or a Web-based communication session.

Figure 3:
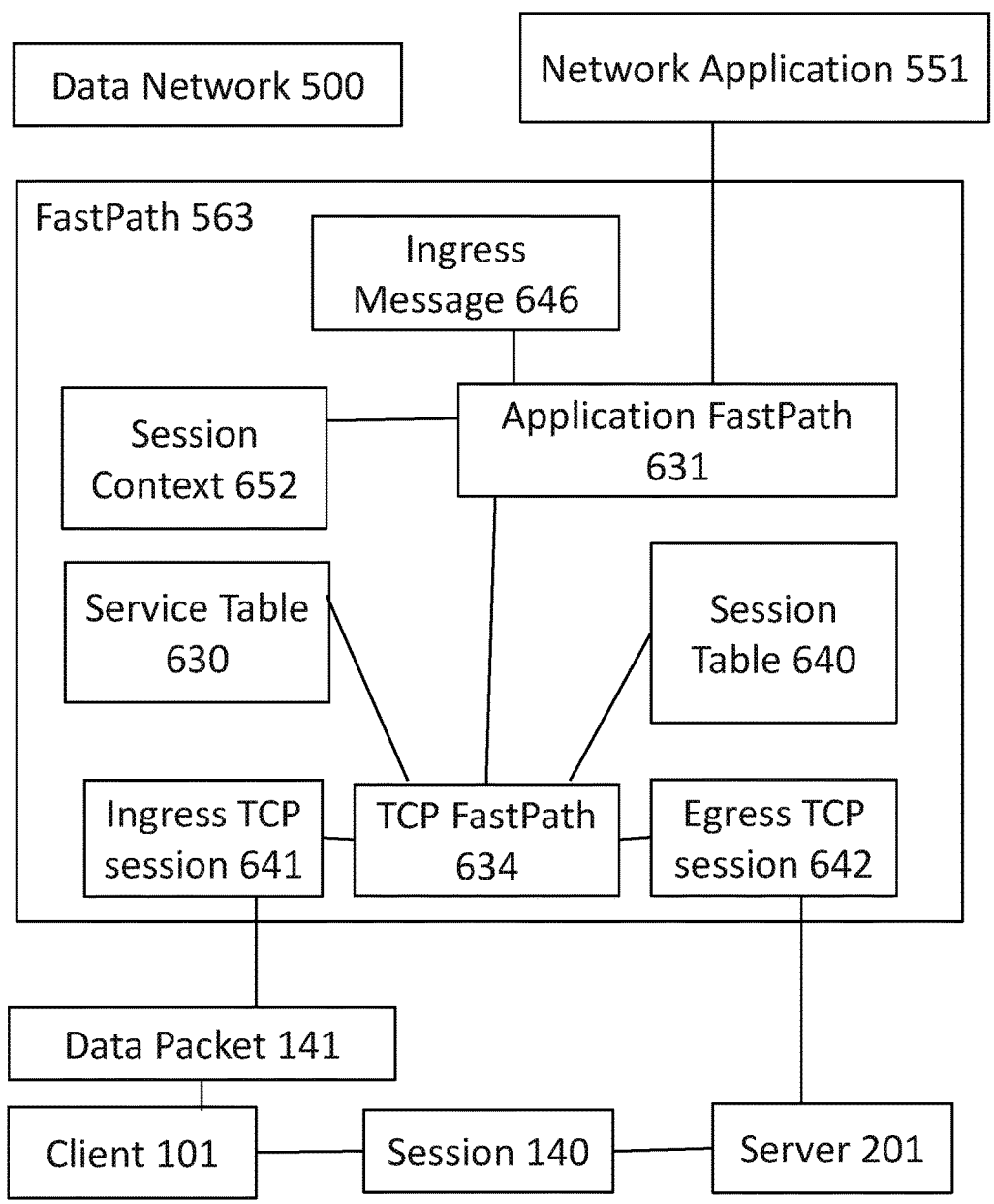
FIG. 3 illustrates an exemplary embodiment of processing a data packet of an ingress TCP session.

FIG. 3 illustrates an exemplary embodiment of processing an ingress TCP session. In one embodiment, client 101 sends data packet 141 of session 140 towards server 201 and fastpath module 563 receives data packet 141. In one embodiment, session 140 is based on TCP protocol. In one embodiment, fastpath module 563 includes a TCP fastpath module 634 which includes one or more computing programming instructions processing TCP protocol. TCP fastpath 634 receives and processes data packet 141.

In one embodiment, TCP fastpath 634 determines data packet 141 is a request to establish a TCP session. The request may be in the form of a TCP/SYN request. TCP fastpath 634 obtains one or more network addresses from data packet 141 and matches the obtained network addresses against service table 630. In one embodiment, the network addresses of data packet 141 include one or more of source IP address, source TCP port number, destination IP address and destination TCP port number. In one embodiment, TCP fastpath 634 determines there is a match for service table 630 and service table 630 provides an indication to application fastpath 631 for further processing of data packet 141. TCP fastpath 634 creates an ingress TCP session 641 record associating to data packet 141. In one embodiment, TCP fastpath 634 stores the obtained network addresses in ingress TCP session 641 and stores ingress TCP session 641 in session table 640. In one embodiment, TCP fastpath 634 stores an indication of application fastpath 631 in ingress TCP session 641. In one embodiment, TCP fastpath 634 sends data packet 141 to application fastpath 631.

In one embodiment, TCP fastpath 634 determines data packet 141 is not a request to establish a TCP session (i.e. a TCP session has already been established). TCP fastpath 634 obtains one or more network addresses from data packet 141 and matches the obtained network addresses against session table 640. If TCP fastpath 634 determines there is a match with ingress TCP session 641 of session table 640, TCP fastpath 634 sends data packet 141 to application fastpath 631, to be processed according to an indication in ingress TCP session 641.

In one embodiment, application fastpath 631 receives data packet 141. Upon processing data packet 141, application fastpath 631 determines if an ingress application layer message has been received. If application fastpath 631 determines data packet 141 is a TCP session request, application fastpath 631 may determine an ingress message 646 is received and stores the TCP session request indication into ingress message 646. In one embodiment, application fastpath 631 determines data packet 141 does not provide sufficient information for an ingress message, application fastpath 631 stores data packet 141 for further processing. For example, if a session has been established, but no relevant data has been exchanged or action taken yet over the session, application fastpath 631 may store data packet 141 until application fastpath 631 can determine what actions will be taken over the session. In one embodiment, application fastpath 631 determines data packet 141, in conjunction with previously stored received data packet from ingress TCP session 641, an ingress message 646 is received. Application fastpath 631 stores the combined data packets into ingress message 646.

In one embodiment, application fastpath 631 sends ingress message 646 to network application 551.

In one embodiment, application fastpath 631 determines a type for ingress message 646 and includes the type into ingress message 646. Ingress message 646 type can be, among other things, one of a TCP session request, an application session request, an application data message, an application session disconnect, an application session error, or a TCP session disconnect.

In one embodiment, application fastpath 631 creates a session context 652 and stores ingress TCP session 641 information such as the one or more network addresses of ingress TCP session 641 into session context 652. In one embodiment application fastpath 631 sends session context 652 to network application 551.

In one embodiment, network application 551 receives ingress message 646, receives session context 652, and processes ingress message 646 and session context 652. In some embodiments, network application 551 stores a server 201 network address into session context 652, so as for application fastpath to create an egress TCP session 642 with server 201. Network application may also store a source network address to be used for the creation of egress TCP session 642. In various embodiments, network application 551 sends modified session context 652 to application fastpath 631. Network application 551 may send an indication to application fastpath 631 to establish egress TCP session 642 with server 201.

In one embodiment, network application 551 modifies ingress message 646 and sends modified ingress message 646 to application fastpath 631.

In one embodiment, application fastpath 631 receives modified session context 652 from network application 551. In one embodiment, application fastpath 631 receives an indication to establish egress TCP session 642 with server 201. Application fastpath 631 obtains server 201 network address information from session context 652. In one embodiment, network address of server 201 is stored in session context 652 by network application 551 and application fastpath 631 obtains the server 201 network address from session context 652. In one embodiment, application fastpath 631 uses the destination network address of ingress TCP session 641 stored in session context 652 as server 201 network address. In one embodiment, network application 551 specifies a source network address for egress TCP session 642 in session context 652, application fastpath 631 obtains the source network address. In one embodiment, application fastpath 631 selects a source network address for egress TCP session 642. Application fastpath 631 instructs TCP fastpath 634 to establish egress TCP session 642 with server 201, using the source network address and server 201 network address. The source network address may be the same as the network address for the client 101. In various embodiments, application fastpath 631 receives an indication from TCP fastpath 634 that egress TCP session 642 is successfully established, application fastpath 631 stores egress TCP session 642 information into session context 652. Application fastpath 631 may also store the source network address and server 201 network address into session context 652.

In one embodiment, after establishing egress TCP session 642, application fastpath 631 sends ingress message 646 to server 201, by instructing TCP fastpath 634 to send ingress message 646 over egress TCP session 642. In one embodiment, application fastpath 631 receives a modified ingress message 646 from network application 551 and sends the modified ingress message 646 to server 201. In one embodiment, application fastpath 631 processes ingress message 646 and optionally modifies ingress message 646. Application fastpath 631 sends ingress message 646 to server 201 after processing.

In one embodiment, TCP fastpath 634 receives an instruction from application fastpath 631 to establish egress TCP session 642 with server 201. TCP fastpath 634 obtains a source network address and a server 201 network address from application fastpath 631. TCP fastpath 634 then establishes egress TCP session 642 with server 201. Upon establishing egress TCP session 642, TCP fastpath 634 creates an egress TCP session 642 record and stores egress TCP session 642 record into session table 640. In one embodiment, TCP fastpath 634 sends egress TCP session 642 information to application fastpath 631.

In one embodiment, TCP fastpath 634 receives ingress message 646 from application fastpath 631. TCP fastpath 634 sends ingress message 646 to server 201 using one or more TCP data packets over egress TCP session 642.

Figure 4:
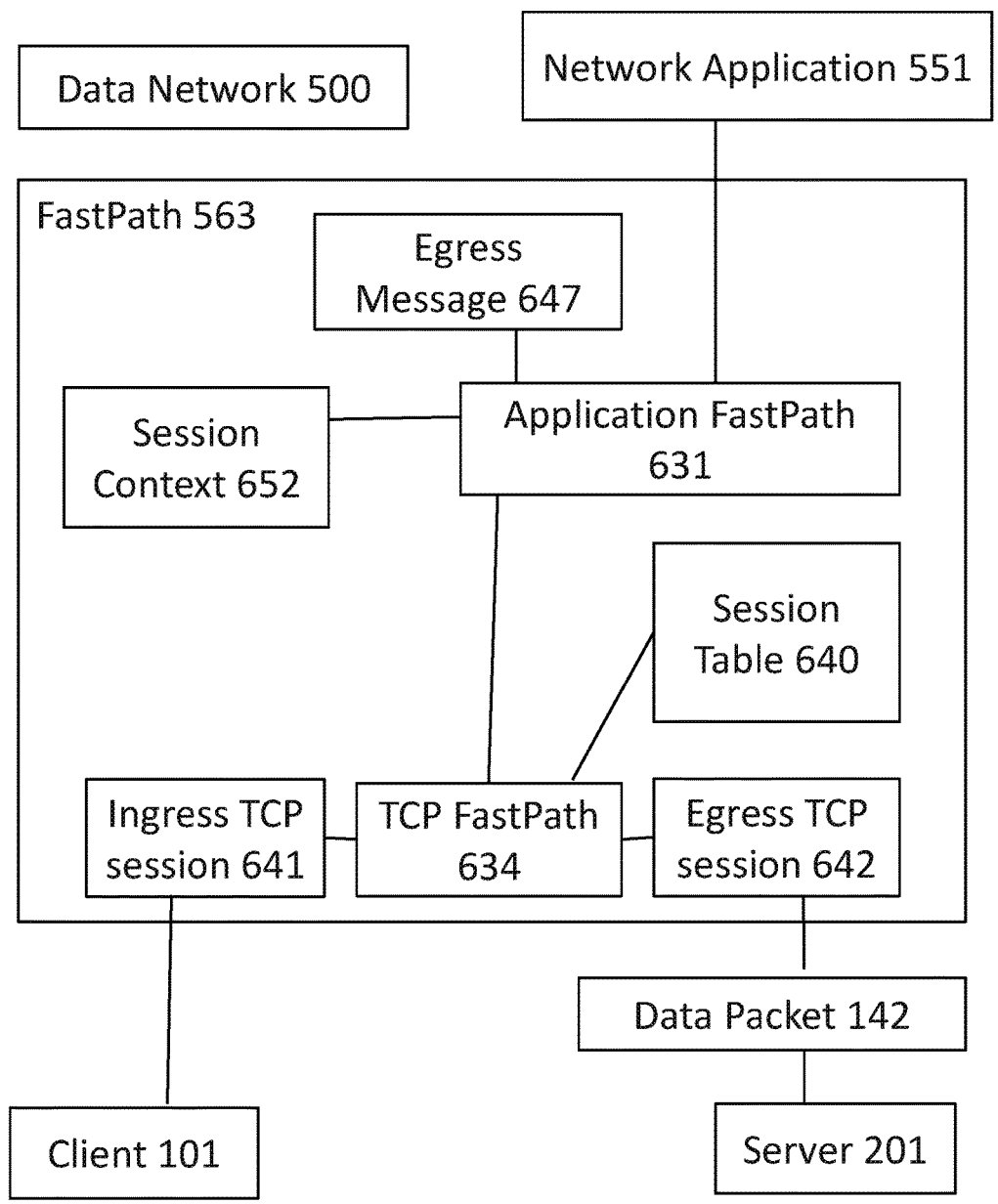
FIG. 4 illustrates an exemplary embodiment of processing a data packet of an egress TCP session.

FIG. 4 illustrates an exemplary embodiment of processing an egress TCP session. In one embodiment, Fastpath module 563 receives data packet 142 from server 201. Fastpath module 563 determines data packet 142 includes a TCP data packet and instructs TCP fastpath 634 to process data packet 142.

In one embodiment, TCP fastpath 634 matches data packet 142 against session table 640. TCP fastpath 634 obtains one or more network addresses from data packet 142 and matches the one or more network addresses against session table 640. In one embodiment TCP fastpath 634 determines there is a match with egress TCP session 642. TCP fastpath 634 sends data packet 142 to application fastpath 631 according to egress TCP session 642.

In one embodiment, application fastpath 631 receives data packet 142 over egress TCP session 642 from TCP fastpath 634. Application fastpath 631 retrieves session context 652 according to egress TCP session 642. Application fastpath 631 then processes data packet 142 and determines if an egress application layer message is received. In one embodiment, application fastpath 631 determines an egress message 647 is received and stores data packet 142 into egress message 647. In one embodiment, application fastpath 631 determines there is not sufficient information for an egress message, and application fastpath 631 stores data packet 142 for later processing. In one embodiment, application fastpath 631 determines that an egress message 647 is received from data packet 142 in combination with previously stored data packets. Application fastpath 631 stores the combined data packets into egress message 647. In one embodiment, application fastpath 631 determines an egress message type, which can be a TCP session establishment completion, a TCP session reset, a TCP session disconnect, an application layer data packet, a response to an application request, an application error message, or other application layer message. Application fastpath 631 may store the egress message type into egress message 647. In one embodiment, application fastpath 631 sends egress message 647 to network application 551. In one embodiment, application fastpath 631 sends egress message 647 at a request from network application 551. In one embodiment, application fastpath 631 sends session context 652 to network application 551 together with egress message 647. In one embodiment, application fastpath 631 does not send egress message 647 to network application 551.

In one embodiment network application 551 receives and processes egress message 647. In one embodiment, network application 551 modifies egress message 647 and sends modified egress message 647 to application fastpath 631. In one embodiment, network application 551 does not modify egress message 647. In one embodiment, network application 551 sends an indication to application fastpath 631 to continue processing egress message 647.

In one embodiment application fastpath 631 receives modified egress message 647 and possibly a continuation indication from network application 551. In one embodiment, application fastpath 631 processes egress message 647, with or without modification from network application 551, and possibly further modifies egress message 647. Upon processing egress message 647, application fastpath 631 instructs TCP fastpath 634 to send egress message 647 to client 101 over ingress TCP session 641, according to information stored in session context 652.

In one embodiment, TCP fastpath 634 receives egress message 647 and an instruction to send egress message 647 to client 101 over ingress TCP session 641. TCP fastpath 634 sends egress message 647 using one or more TCP data packets over ingress TCP session 641 to client 101.

Figure 5:
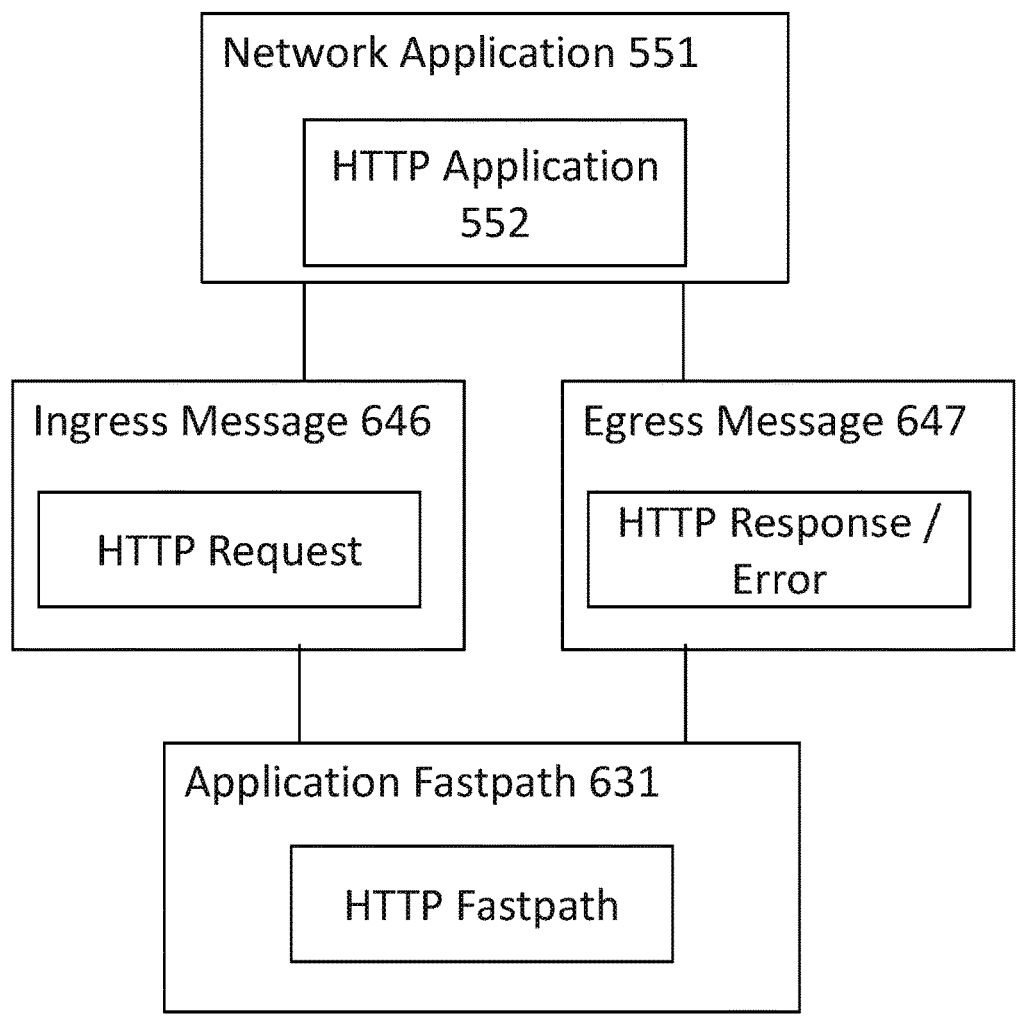
FIG. 5 illustrates an exemplary embodiment of a HTTP network application.

FIG. 5 illustrates an exemplary embodiment of a Fastpath assisting a HTTP-based network application. FIG. 5 is to be read in combination of FIG. 3 and FIG. 4. In this embodiment, network application 551 includes an HTTP application 552, a network application based on HTTP protocol. In one embodiment, HTTP application 552 includes functionality of one or more of server selection, server load balancing, cookie insertion and removal, HTTP proxy, secure HTTP proxy, HTTP firewall, HTTP-based threat protection system (TPS), and XML firewall. In one embodiment, ingress message 646 can be an HTTP request message such as a GET-REQUEST or a POST-REQUEST. An egress message 647 can be an HTTP response message. Application fastpath 631 includes HTTP fastpath, which may process cookie insertion or removal, HTTP header pattern substitution, or HTTP content processing.

In one embodiment, HTTP application 552 indicates to application fastpath 631 to send both HTTP request messages and HTTP response messages to HTTP application 552. In one embodiment, HTTP application 552 indicates to application fastpath 631 to send only HTTP request messages. In one embodiment, HTTP application 552 provides server 201 information to HTTP fastpath to establish egress TCP session with server 201. In one embodiment, HTTP application 552 provides cookie information and other information to HTTP fastpath such that HTTP fastpath can process cookie insertion/removal and other HTTP data packet processing. In this way, server selection by HTTP application 552 may occur based on content of the data packet being processed, rather than simply the source and destination.

Application fastpath 631, operating in conjunction with HTTP fastpath, allows for fastpath processing of the specific structure of http packets (header and body), in compliance with the protocol. Thus, in the exemplary embodiment of FIG. 5, application fastpath 631 is able to parse the data packets according to the HTTP syntax and grammar.

In various embodiments of the present disclosure, a user of a network node 510 can create and apply custom network applications with application layer processing on network node 510. The user-created custom network applications may override previous network application(s) operating on a network node 510 or may supplement network application(s) previously operating on network node 510. For example, if data is arriving from a mobile network, a user may desire a custom TCP stack. Embodiments of the present disclosure allow a user to insert headers with the disclosed modules that are proprietary and specific to the user's needs. The network node 510 and modules operating in conjunction with network node 510 provide insertion points for application level processing done by the user. While the above HTTP fastpath example illustrates one exemplary method of custom operation, other methods of custom operation are within the scope of the present disclosure.

Figure 6:
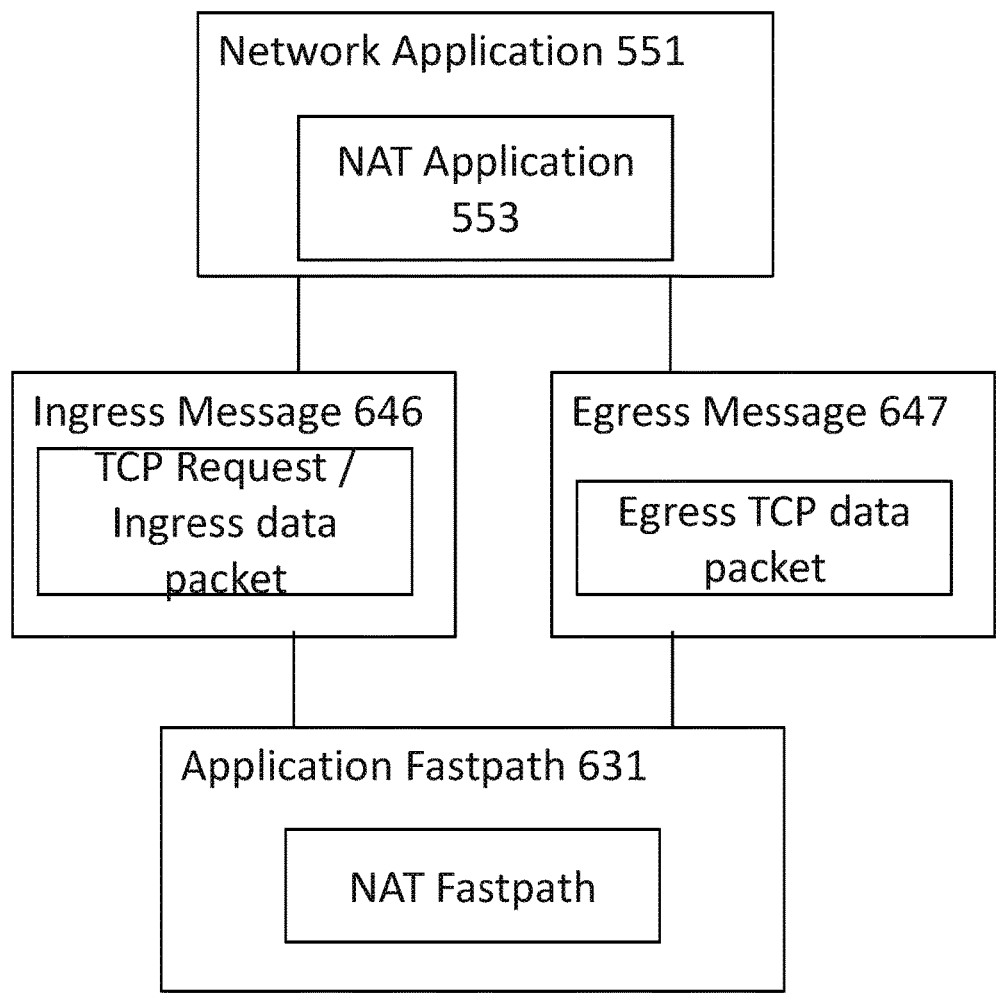
FIG. 6 illustrates an exemplary embodiment of a NAT network application.

FIG. 6 illustrates an exemplary embodiment of a fastpath module assisting a network application based on network address translation (NAT). FIG. 6 is to be read in combination of FIG. 3 and FIG. 4. In this embodiment, network application 551 includes an NAT application 553, a network application handling network address translation. In one embodiment, NAT application 553 includes functionality of one or more of source network address selection, port address selection, application level gateway (ALG), and application level gateway processing for SIP, FTP or other protocols. In one embodiment, ingress message 646 can be a TCP session request message or a TCP data packet. An egress message 647 can be a TCP data packet. Application fastpath 631 includes network address transition (NAT) fastpath, which may include processing for network address substitution, or ALG for a plurality of application layer protocols.

In one embodiment, NAT application 553 indicates to application fastpath 631 to send both ingress TCP session request message, ingress TCP data packets and egress TCP data packets to NAT application 553. In one embodiment, NAT application 553 indicates to application fastpath 631 to send only ingress TCP session request message. In one embodiment, NAT application 553 provides information to application fastpath 631 to perform network address substitution or ALG processing. In this way, application fastpath 631, when including NAT fastpath, may allow for the payload of data packets to be changed in accordance with network address translation through the application fastpath 631 since the data packets may have the network addresses embedded in the payload itself.

Figure 7:
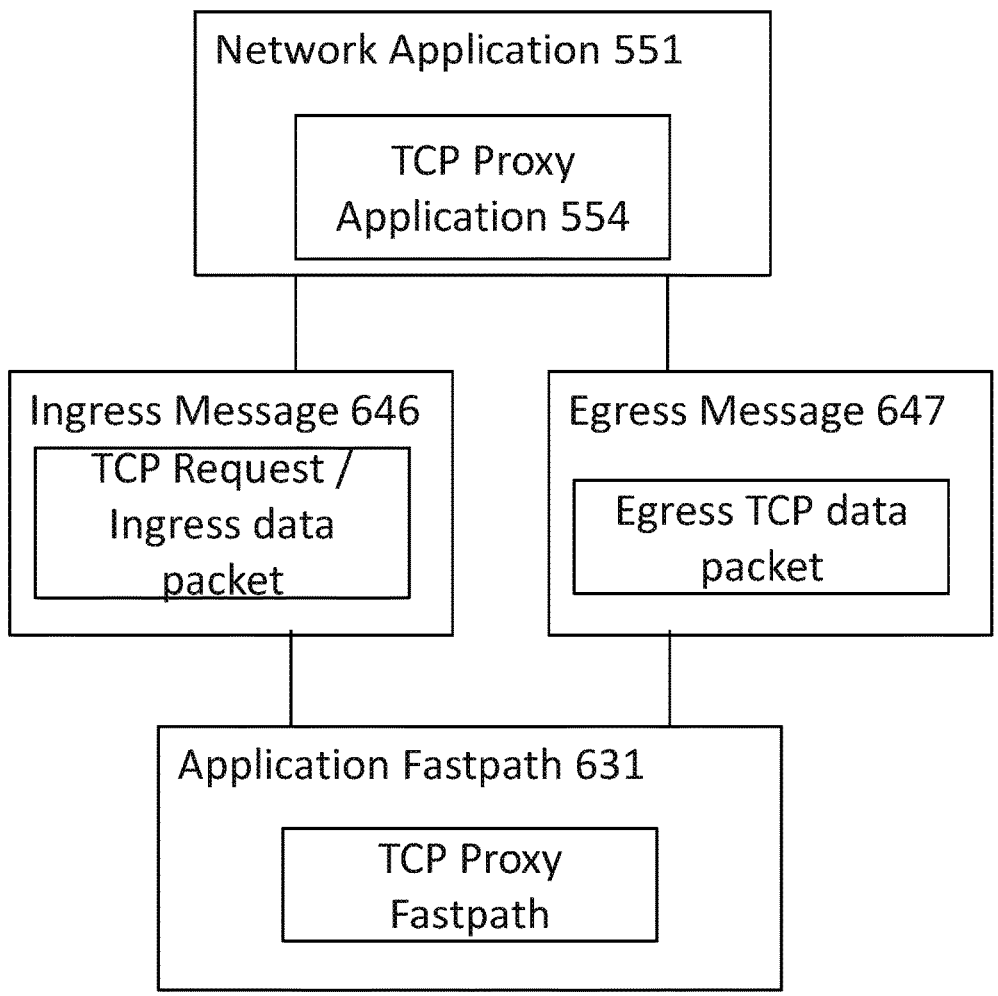
FIG. 7 illustrates an exemplary embodiment of a TCP proxy network application.

FIG. 7 illustrates an exemplary embodiment of a Fastpath module assisting a network application providing TCP proxy functionality. FIG. 7 is to be read in combination with FIG. 3 and FIG. 4. In this embodiment, network application 551 includes a TCP proxy application 554, a network application providing TCP proxy functionality. In one embodiment, TCP proxy application 554 includes functionality of one or more of server address selection, network and/or port address selection, secure TCP session proxy functionality, SSL proxy functionality, deep packet inspection and/or other security functionality. In one embodiment, ingress message 646 can be a TCP session request message or a TCP data packet. An egress message 647 can be a TCP data packet. Application fastpath 631 includes TCP proxy fastpath, which may include processing capability for network address substitution, ALG for one or more of application layer protocols, encryption and decryption, packet tracing, or other security related processing.

In one embodiment, TCP proxy application 554 indicates to application fastpath 631 to send TCP session request messages, ingress TCP data packets and egress TCP data packets to TCP proxy application 554. In one embodiment, TCP proxy application 554 indicates to application fastpath 631 to send only TCP session request messages. In one embodiment, TCP proxy application 554 indicates to application fastpath 631 network address translation and ALG information such that TCP proxy fastpath can perform network address substitution and ALG for ingress TCP session and egress TCP session. In one embodiment, TCP proxy application 554 provides to TCP proxy fastpath attributes related to security processing.

The above description is illustrative and not restrictive. Many variations of the invention will become apparent to hose of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A servicing node comprising:
a fastpath module for processing data packets, the fastpath module stored in memory at the servicing node and executed by at least one processor, wherein the fastpath module:
receives an application service request data packet from a client device, over a network session between the client device and the servicing node;
obtains one or more network addresses from the application service request data packet and matches the obtained one or more network addresses with a session table for the network session between the client device and the servicing node;
determines that the one or more network addresses match an ingress session of the session table, the session table storing an indication for processing application service request data packets associated with the ingress session using a network application residing at the servicing node, wherein the network application includes a user-loadable network application loaded into the servicing node by a user of the servicing node;
stores the application service request data packet into an ingress message;
based on the indication, sending the ingress message to the network application for processing; and
upon the processing, transmits the application service request data packet to a server using egress session information.

2. The servicing node of claim 1, wherein the servicing node is a server load balancer.

3. The servicing node of claim 1, wherein the servicing node is an application delivery controller.

4. The servicing node of claim 1, wherein the ingress message is an application layer message.

5. The servicing node of claim 1, wherein the fastpath module further:
processes the application service request data packet according to an application layer protocol used by the network application.

6. The servicing node of claim 5, wherein the application layer protocol is one of: HTTP, SIP, FTP, secure HTTP, instant messaging protocol, file transfer protocol, streaming protocol, or real time streaming protocol.

7. The servicing node of claim 1, wherein the fastpath module is a high performance TCP stack.

8. The servicing node of claim 1, wherein the fastpath module
transmits the ingress message to the network application via fastpath processing.

9. The servicing node of claim 1, wherein the fastpath module further:
receives a response data packet from the server;
determines that the data packet is associated to the egress session;
processes the data packet according to egress session information; and
sends the processed data packet to the client device using ingress session information.

10. The servicing node of claim 9, wherein the egress session information and the ingress session information are stored in the session table.

11. The servicing node of claim 9, wherein the egress session and the ingress session are TCP sessions.

12. The servicing node of claim 9, wherein the egress session and the ingress session are HTTP sessions.

13. The servicing node of claim 9, wherein the egress session and the ingress session are SIP sessions.

14. A method for processing data packets via a fastpath module stored in memory at a servicing node and executed by at least one processor, the method comprising:
receiving an application service request data packet from a client device, over a network session between the client device and the servicing node;
obtaining one or more network addresses from the application service request data packet and matching the obtained one or more network addresses with a session table for the network session between the client device and the servicing node;
determining that the one or more network addresses match an ingress session of the session table, the session table storing an indication for processing application service request data packets associated with the ingress session using a network application residing at the servicing node, wherein the network application includes a user-loadable network application loaded to the servicing node by a user of the servicing node;
storing the application service request data packet into an ingress message;
based on the indication, sending the ingress message to the network application for processing; and
upon the processing, transmitting the application service request data packet to a server using egress session information.

15. The method of claim 14, wherein the servicing node is an application delivery controller.

16. The method of claim 14, wherein the ingress message is an application layer message.

17. The method of claim 14, further comprising:
processing the application service request data packet according to an application layer protocol used by the network application.

18. The method of claim 17, wherein the application layer protocol is one of: HTTP, SIP, FTP, secure HTTP, instant messaging protocol, file transfer protocol, streaming protocol, or real time streaming protocol.

19. The method of claim 14,
wherein the ingress message is transmitted to the network application via fastpath processing.

20. The method of claim 14, further comprising:
receiving a response data packet from the server;
determining that the data packet is associated to the egress session;
processing the data packet according to egress session information; and
sending the processed data packet to the client device using ingress session information.

* * * * *